Figure 1:
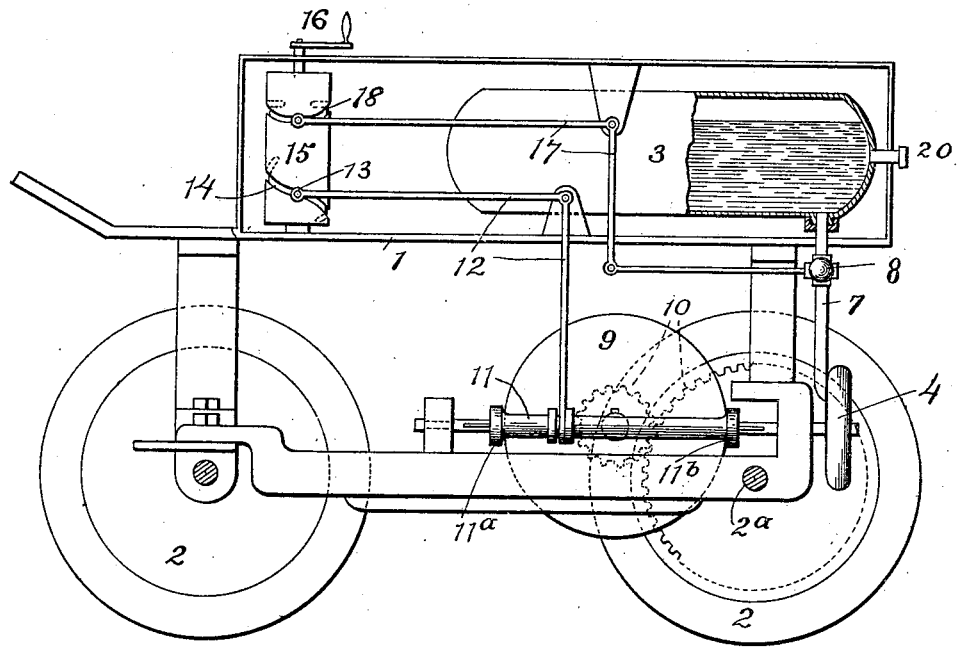

No. 680,204. Patented Aug. 6, 1901.
A. H. HOADLEY.
MOTOR.
(Application filed Jan. 24, 1899.)

(No Model.)

Witnesses.
M. V. Bidgood
W. P. Hammond

Inventor.
Alfred H. Hoadley
By
Attys

THE NORRIS PETERS CO., PHOTO-LITHO., WASHINGTON, D. C.

UNITED STATES PATENT OFFICE.

ALFRED H. HOADLEY, OF WORCESTER, MASSACHUSETTS, ASSIGNOR TO PNEUMATIC CARRIAGE COMPANY, OF NEW YORK, N. Y.

MOTOR.

SPECIFICATION forming part of Letters Patent No. 680,204, dated August 6, 1901.

Application filed January 24, 1899. Serial No. 703,219. (No model.)

*To all whom it may concern:*

Be it known that I, ALFRED H. HOADLEY, a citizen of the United States, residing at Worcester, in the county of Worcester and State of Massachusetts, have invented certain new and useful Improvements in Motors, of which the following is a specification.

This invention relates to improvements in motors, and has especial reference to motors of the steam-turbine type and to the application of same to the propulsion of vehicles.

A defect of steam-turbines which is of especial importance in their application to locomotive purposes is the comparatively small starting torque or effort they are able to exert. To increase this torque, I use as the motive agent a mixture of water and steam resulting from the expansion of hot water; but even with this provision the starting torque, with ordinary means of mechanical transmission is insufficient, and the main feature of my invention is the interposition of a variable-speed gearing, preferably friction-gearing, between the turbine and the part to be driven thereby, so that the turbine may run continuously at very high speed, while the speed of the driven part may be varied within wide limits, and in starting the ratio of speed reduction, and therefore the starting torque, may be rendered sufficient to start the vehicle even with the slight torque of a turbine.

Theoretically the starting torque of a steam-turbine might be indefinitely increased by simply increasing the ratio of reduction in the gearing if it were not for the fact that the maximum speed of the turbine is limited both by mechanical conditions and by the velocity of the steam-jet, so that there is a limit to the ratio of reduction when the driven shaft of the engine is running at full speed; but by means of the variable gear the effective starting torque may be rendered comparatively great, and then when the motor speeds up the ratio of reduction may be decreased, so as to enable the driven part to attain full speed without excessive rapidity of rotation of the impact-wheel.

A turbine supplied with hot water as a driving agent is particularly suited for the propulsion of automobiles on account of the comparative noiselessness and simplicity of same as compared with the pressure-operated engines and on account of its high starting torque as compared with the steam-turbine proper. The variable-gear feature is also of importance in this connection. Inasmuch as a turbine is capable of operation in only one direction, I provide also reversing means in the transmitting-gear, the variable gear above referred to being preferably arranged to reverse or to cut off the transmitting connection when desired. Means are provided for cutting off the supply of driving fluid when the said transmitting connection is disconnected. This disconnection takes place when the controller is in its middle position, so that motion of the controller to one side or the other will operate to turn on pressure from the fluid-pressure reservoir and simultaneously to connect the transmitting mechanism to drive the vehicle in one direction or the other, as the case may be.

Figure 2:
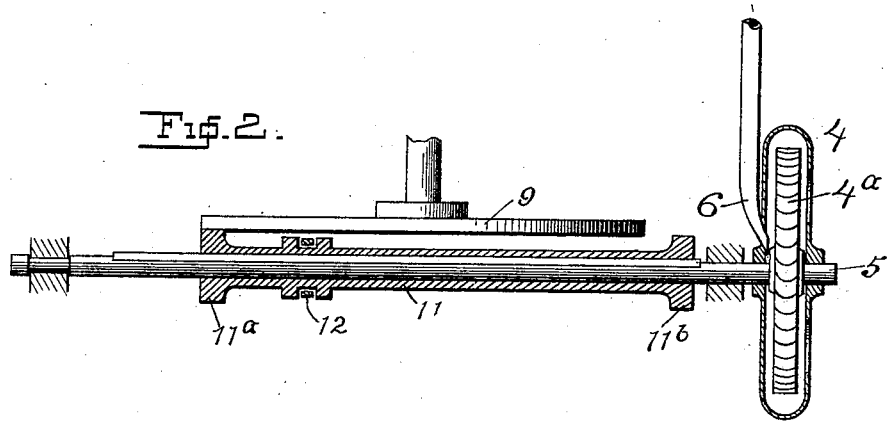

Referring to the accompanying drawings, which form a part of this specification, Figure 1 is a diagrammatic vertical section of a motor-vehicle provided with my invention. Fig. 2 is a horizontal section of the motor and the frictional transmitting-gearing.

Referring to Fig. 1, the frame or body 1 of the vehicle is supported in the usual manner on wheels 2 and carries the hot-water or fluid-pressure reservoir 3 and the driving-motor 4. The said motor is an impact steam engine or turbine and may, as indicated in Fig. 2, comprise an impact-wheel 4ª, mounted on shaft 5, journaled in suitable bearings in the frame, and a nozzle 6, which is adapted to deliver to the buckets of said wheel a jet of mixed water and steam, led to said nozzle from the reservoir 3 through a pipe 7, in which is interposed the throttle-valve 8. The pipe 7 leads from the lower part of reservoir 3, so as to draw water and not steam therefrom. The hot water in reservoir 3 is at a pressure greatly above the atmospheric pressure—for example, a pressure of several hundred pounds per square inch—so that when the throttle-valve is opened a stream of water is forced out through nozzle 6, and a portion of such water is expanded in the nozzle to form steam, which issues at a high velocity, carrying the unexpanded portion of the water with it, and this mixture of water and steam impinging on the impact-wheel 4ᵃ exerts a rotary force or torque therein which is proportionate to the mass so delivered and its velocity. The water delivered along with the steam has thus a distinct effect in adding to the torque of the motor.

For transmitting the motion of the turbine to the driving-axle 2ᵃ of the motor I employ a variable and reversible gearing, preferably frictional, as indicated, the same comprising a friction plate or disk 9, connected by toothed gearing 10 to the driving-axle and engaging frictionally with a sleeve 11, splined to the shaft 5 of the turbine wheel 4ᵃ, so as to revolve therewith but to be capable of sliding longitudinally on the motor-shaft 5. Said sleeve 11 carries two friction collars or wheels 11ᵃ 11ᵇ, whereby it engages with disk 9 on one side or the other of the center of same, according to the longitudinal position of said sleeve. When this sleeve is in the position shown in Fig. 1, the two collars 11ᵃ 11ᵇ are just beyond the periphery of the disk, on either side thereof, so that the transmitting-gear is disconnected. By moving this sleeve longitudinally on the shaft one way or the other the collar 11ᵃ or the collar 11ᵇ will be brought into engagement with disk 9, and the said disk will thus be rotated in one direction or the other, the speed of rotation being at a minimum at first and gradually increasing as the driving-wheel 11ᵃ or 11ᵇ is brought closer to the center of disk 9. To shift the sleeve 11 in this manner, I provide controlling mechanism consisting, for example, of a lever 12, pivoted to the frame 1 and engaging at one end by a yoke-and-groove connection with the sleeve 11, the other end of said lever engaging by a pin 13 in a groove 14 of a controller-cylinder 15, having a handle 16. The groove 14 is inclined in a helical manner, as shown, so that as the controller-handle is turned the lever 12 will be operated to shift the sleeve 11. Associated with such controlling means I provide means for cutting off the supply of motive fluid when the gearing is in the disconnected position, such means consisting of a lever 17, controlled by a groove 18 in cylinder 15 and connected to the throttle-valve 8. The groove 18 is doubly inclined, as shown, so that in the "middle" position of the handle 16 the lever 17 is held in one extreme position to close the valve 8, and on moving the handle either way the lever 17 will be thrown to open the valve 8.

Thus when the handle is turned to position to disconnect the motor the supply of hot water is cut off at the same time. If this shutting off is only temporary and the controller is moved within a short time to admit the motive fluid again, the turbine wheel, having been disconnected so as to run freely, will still be rotating at a high speed and its momentum will aid in starting the vehicle. Moreover, even in starting from a position of rest the motive agent may be admitted to the turbine before the transmitting-gearing is operatively engaged, so that the wheel 4ᵃ is enabled to speed up to some extent before the load is brought on, and thus the difficulty of starting is partially overcome.

Braking and steering mechanisms are of course provided, but are not shown, as they form no part of my present invention.

The reservoir 3 may have filling tap or connection 20.

Having thus described my invention, what I claim as new therein, and desire to secure by Letters Patent, is—

1. The combination in a motor-vehicle, of a fluid-pressure reservoir supported on the vehicle, an impact-motor having a connection to said reservoir, a valve in said connection, a controller for said valve, and transmitting-gearing between the motor and a driving-wheel of the vehicle, said transmitting-gearing comprising a variable-speed mechanism and a controller for said variable-speed mechanism.

2. In a motor-vehicle, the combination of a fluid-pressure reservoir supported in the vehicle, an impact-motor having a connection with said reservoir, a variable-speed and reversible transmitting mechanism operatively connecting said motor to a driving-wheel of the vehicle, and a controller for said mechanism.

3. In a motor-vehicle, the combination of a fluid-pressure reservoir supported in the vehicle, an impact-motor having a connection with such reservoir, a throttle-valve in such connection, a variable-speed and reversing mechanism connecting said motor to a driving-wheel of the vehicle, and a controller connected to said variable-speed and reversing mechanism and to the said throttle-valve to control the same simultanously.

ALFRED H. HOADLEY.

Witnesses:
CLARENCE H. NEIMYER,
C. M. CLAYTON.